(12) United States Patent
Kim et al.

(10) Patent No.: US 8,896,623 B2
(45) Date of Patent: Nov. 25, 2014

(54) MOBILE DEVICE AND METHOD OF CONTROLLING MOBILE DEVICE

(75) Inventors: Sangwon Kim, Gyeonggi-do (KR); Rakhyun Kim, Incheon (KR)

(73) Assignee: LG Electronics Inc., Seoul (KR)

( * ) Notice: Subject to any disclaimer, the term of this patent is extended or adjusted under 35 U.S.C. 154(b) by 380 days.

(21) Appl. No.: 13/370,171

(22) Filed: Feb. 9, 2012

(65) Prior Publication Data

US 2012/0313925 A1 Dec. 13, 2012

(30) Foreign Application Priority Data

Jun. 9, 2011 (KR) .......................... 10-2011-0055792

(51) Int. Cl.
*G09G 5/00* (2006.01)
*G06F 17/30* (2006.01)

(52) U.S. Cl.
CPC ................. *G06F 17/30056* (2013.01)
USPC ........................................................ 345/619

(58) Field of Classification Search
None
See application file for complete search history.

(56) References Cited

U.S. PATENT DOCUMENTS

| | | | | |
|---|---|---|---|---|
| 6,128,010 A * | 10/2000 | Baxter et al. | .................. | 715/846 |
| 7,581,176 B2 * | 8/2009 | Wilson | .......................... | 715/243 |
| 8,520,025 B2 * | 8/2013 | Patterson et al. | ............ | 345/619 |
| 8,689,100 B2 * | 4/2014 | Tomita et al. | ................. | 715/255 |
| 2001/0007980 A1 | 7/2001 | Ishibashi et al. | | |
| 2005/0216886 A1 * | 9/2005 | Washburn | ...................... | 717/110 |
| 2006/0059437 A1 * | 3/2006 | Conklin, III | .................. | 715/800 |
| 2006/0202954 A1 * | 9/2006 | Ho | ................. | 345/156 |
| 2008/0017422 A1 * | 1/2008 | Carro | .......................... | 178/18.03 |
| 2009/0297027 A1 * | 12/2009 | Umeda et al. | ................. | 382/176 |
| 2010/0315359 A1 * | 12/2010 | Seong et al. | .................. | 345/173 |
| 2011/0167350 A1 * | 7/2011 | Hoellwarth | ................... | 715/727 |
| 2011/0179350 A1 * | 7/2011 | Capela et al. | ................. | 715/244 |

FOREIGN PATENT DOCUMENTS

| | | |
|---|---|---|
| EP | 1077414 | 2/2001 |
| JP | 2010211490 | 9/2010 |
| KR | 1020090111762 | 10/2009 |
| WO | 2010/125768 | 11/2010 |

OTHER PUBLICATIONS

Korean Intellectual Property Office Application Serial No. 10-2011-0055792, Office Action dated Oct. 30, 2012, 6 pages.
Harrison, et al., "Transparent Layered User Interfaces: An Evaluation of a Display Design to Enhance Focused and Divided Attention", Conference on Human Factors in Computing Systems, Chi '95 Mosaic of Creativity, May 1995, 8 pages, XP000538461.
European Patent Office Application Serial No. 12001363.6, Search Report dated Jan. 3, 2013, 10 pages.

* cited by examiner

*Primary Examiner* — Ryan R Yang
(74) *Attorney, Agent, or Firm* — Lee, Hong, Degerman, Kang & Waimey

(57) ABSTRACT

According to one embodiment, a method of controlling a mobile device includes detecting, by the mobile device, one or more objects associated with a displayed first page and located on a page other than the displayed first page; receiving, by the mobile device, a selection of at least one object of the one or more detected objects; and displaying, by the mobile device, the at least one selected object on the first page.

14 Claims, 12 Drawing Sheets

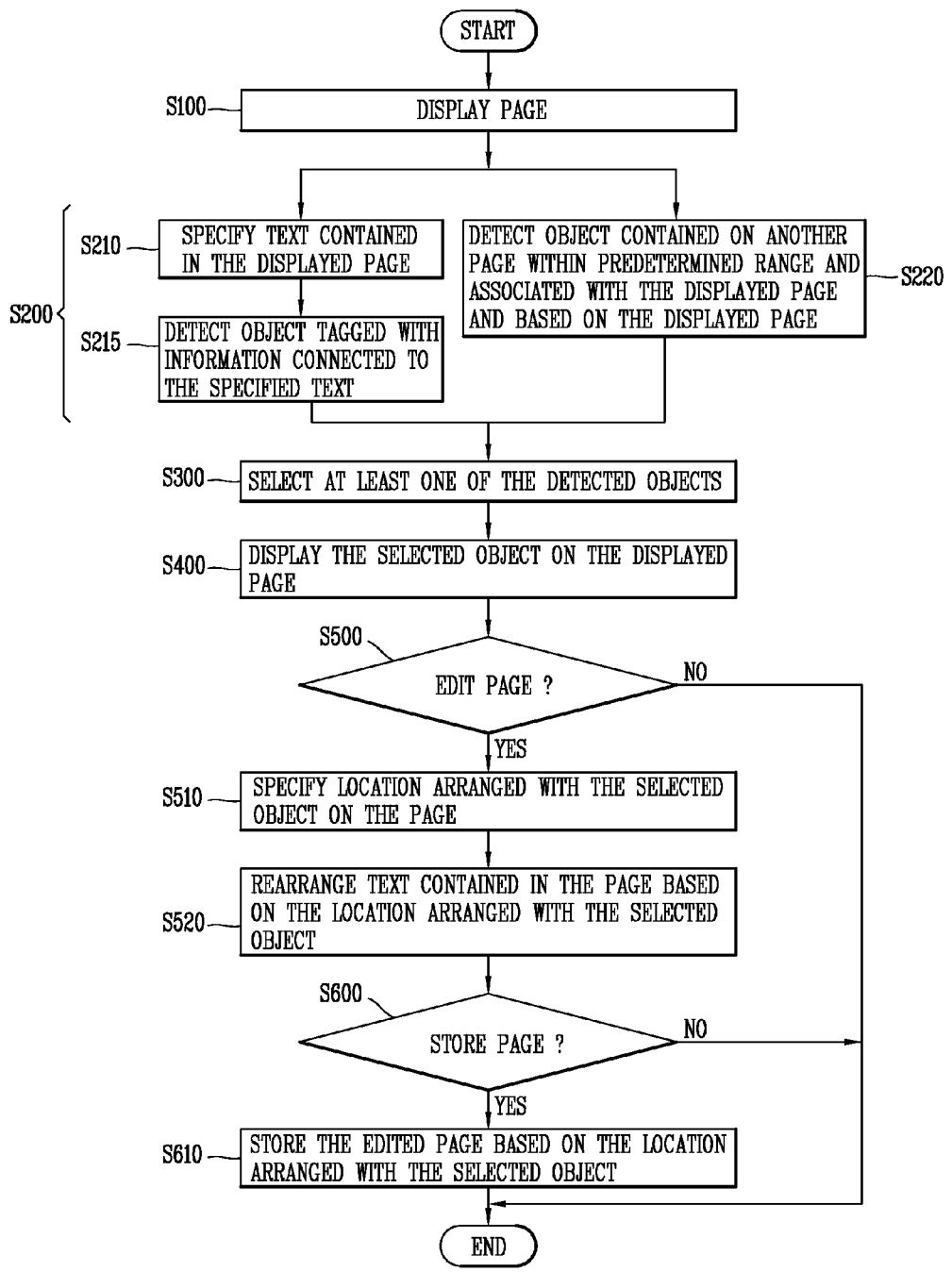

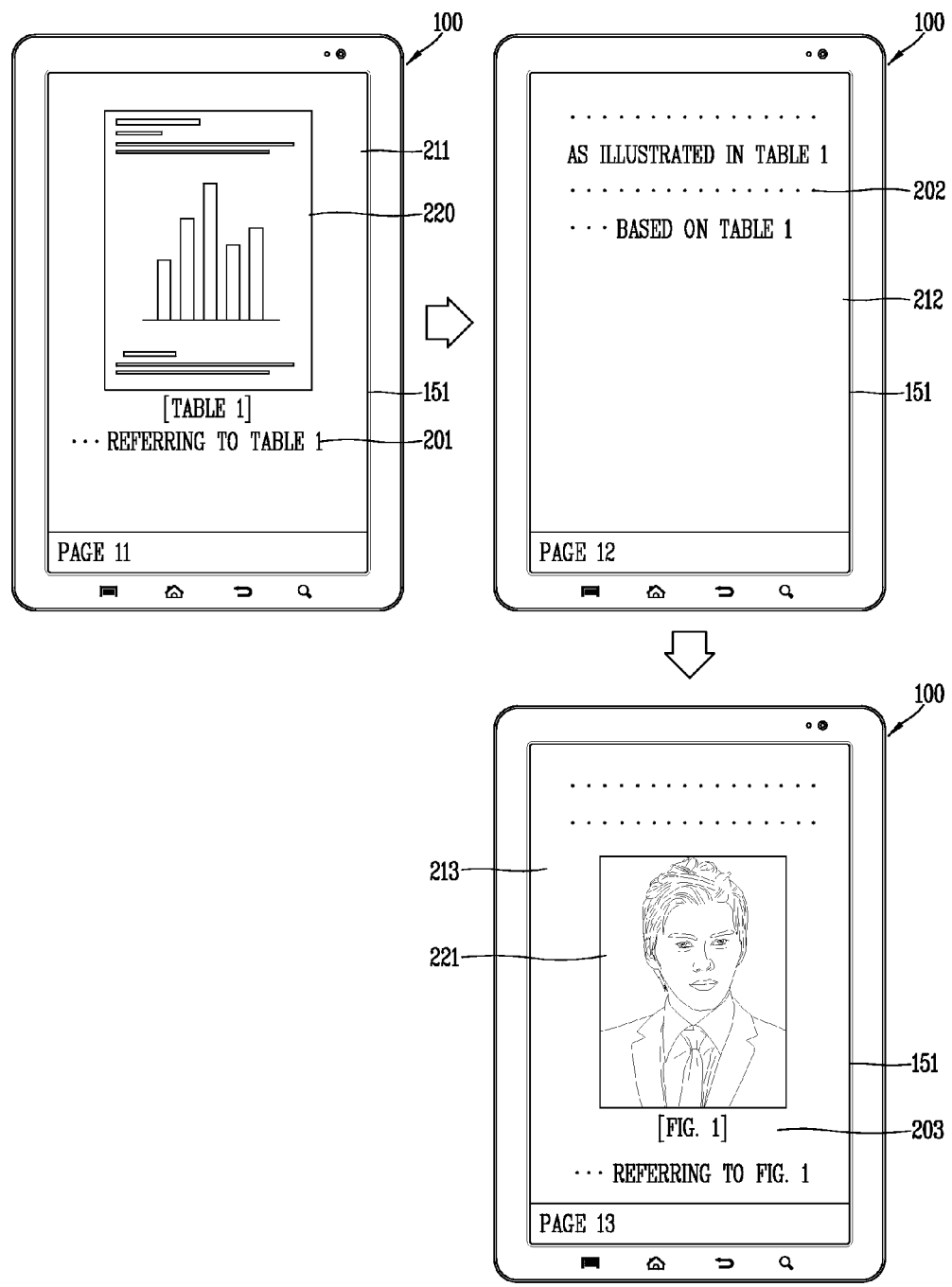

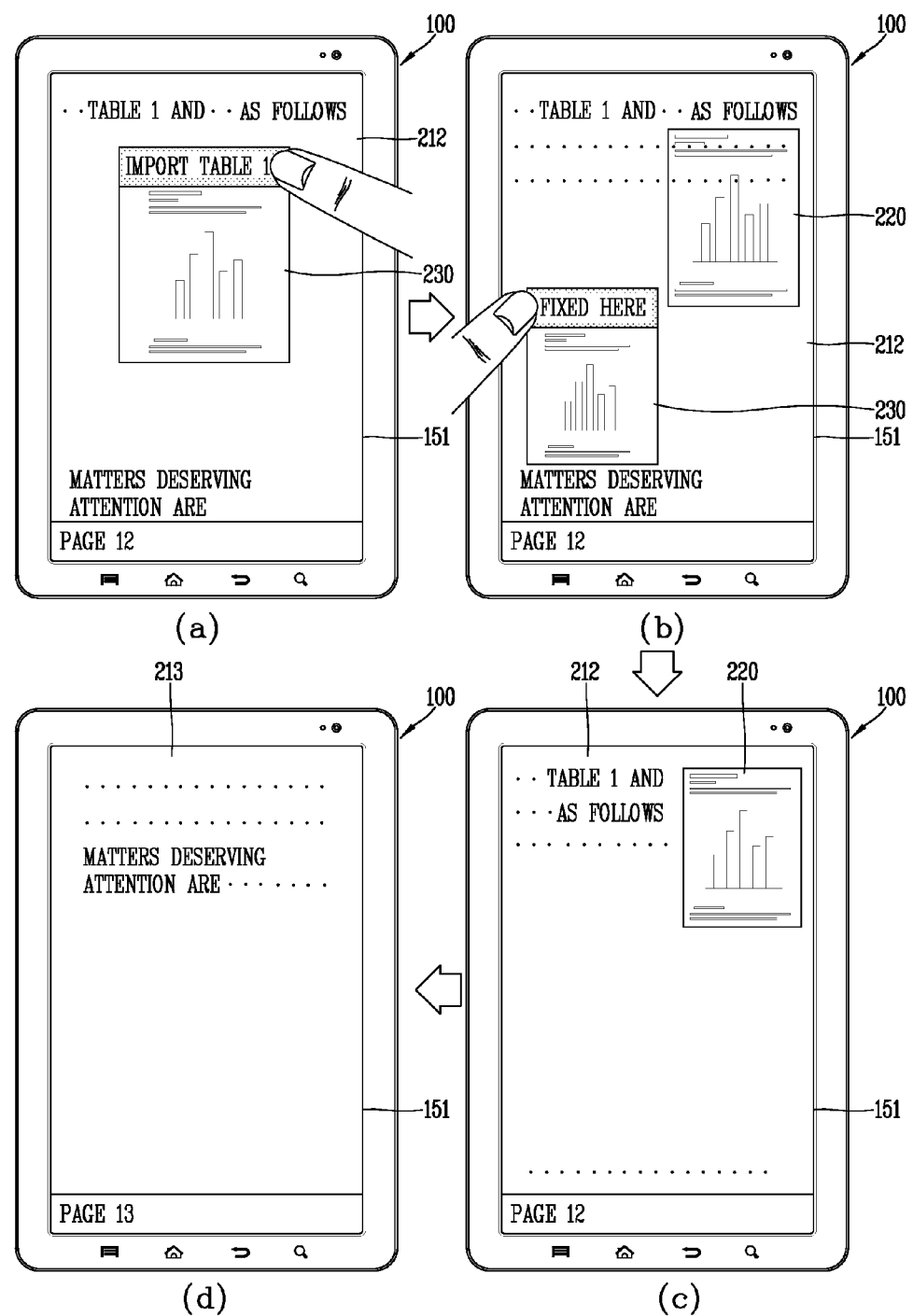

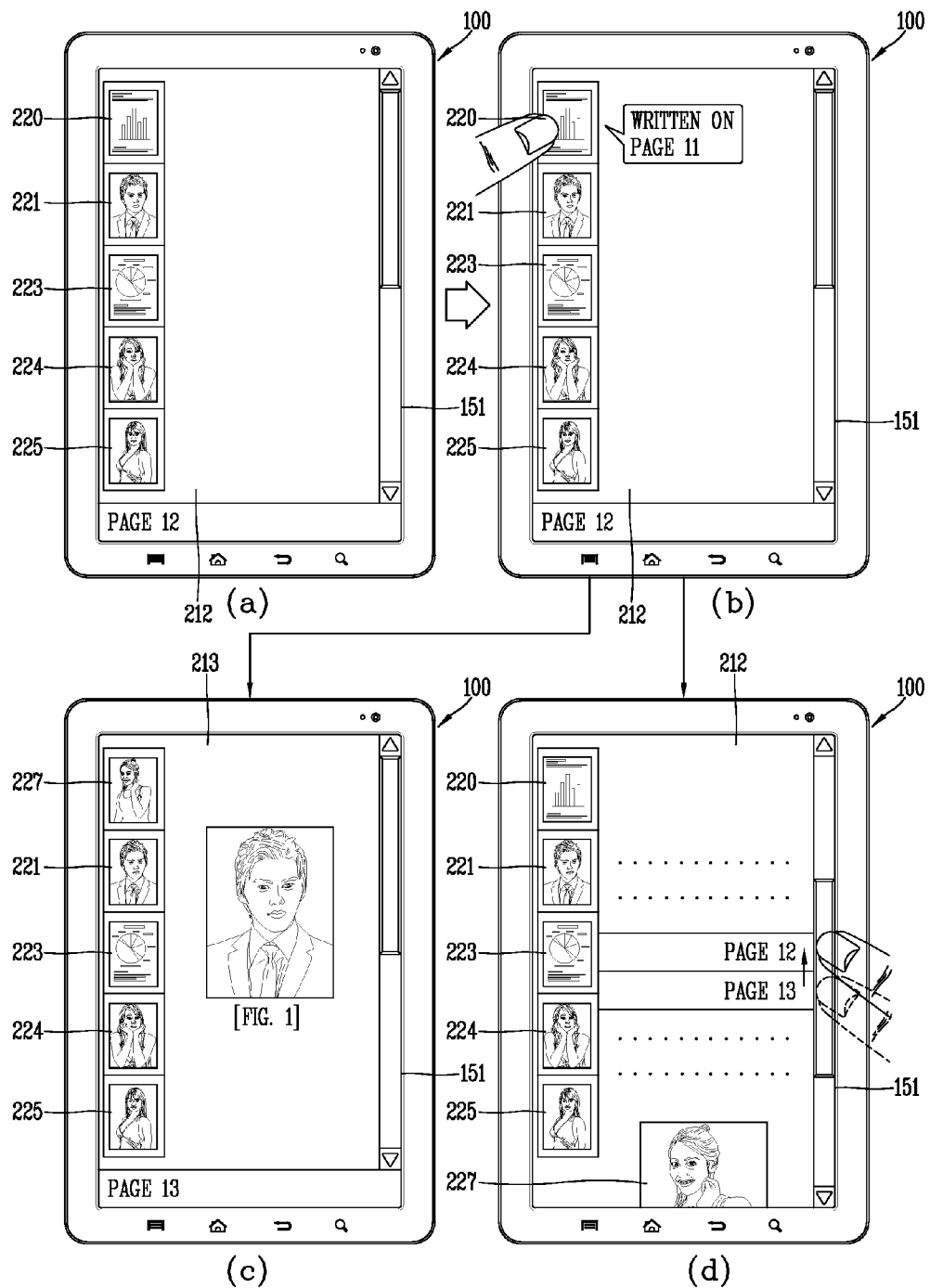

MOBILE DEVICE AND METHOD OF CONTROLLING MOBILE DEVICE

CROSS REFERENCE TO RELATED APPLICATIONS

Pursuant to 35 U.S.C. §119(a), this application claims the benefit of earlier filing date and right of priority to Korean Application No. 10-2011-0055792, filed on Jun. 9, 2011, the contents of which are incorporated by reference herein in its entirety.

FIELD OF THE INVENTION

Embodiments of the present invention relate to a mobile device and a method of controlling the mobile device. Particular embodiments of the present invention relate to a mobile device capable of displaying an electronic book (i.e., e-book) and a method of controlling the mobile device.

DESCRIPTION OF THE RELATED ART

A mobile device is an electronic device that can be carried by the user. The mobile device has at least a voice and video communication function, an information input/output function, or a data storage function.

As mobile devices become increasingly multifunctional, a mobile device may be implemented as an integrated multimedia player capable of providing various functions such as capturing still images or moving images, playing music or video files, playing games, receiving broadcast services, and connecting to the Internet.

A variety of attempts have been made to improve the hardware or software of an integrated multimedia player in order to implement various complicated functions. To provide increased functional support and enhancements of a mobile device, improvements of structural and/or software aspects of the mobile device may be considered When a user views an e-book using a mobile device, a page including text and images may be displayed. An image associated with a text link on the displayed page may not be displayed on the page. As such, the user is faced with the inconvenience of having to turn to another page in order to view the image associated with the text link.

SUMMARY

Aspects of the present invention are directed toward a mobile device and a method of controlling a mobile device in which objects associated with a text are collected and the collected objects are displayed along with the associated text, thereby promoting user convenience.

According to one embodiment, a method of controlling a mobile device includes detecting, by the mobile device, one or more objects associated with a displayed first page and located on a page other than the displayed first page; receiving, by the mobile device, a selection of at least one object of the one or more detected objects; and displaying, by the mobile device, the at least one selected object on the first page.

The detected one or more objects may include at least an image, a video or text, and may be tagged with information associated with the first page.

Detecting the one or more objects may include: receiving a selection of text on the displayed first page; and detecting an object that is tagged with information associated with the selected text and located on the page other than the displayed first page.

The method may also include displaying a list of the detected one or more objects or one or more icons related to the detected one or more objects on the first page based on the selected text.

Displaying the at least one selected object may include displaying an object corresponding to at least one object selected from the displayed list or from the displayed one or more icons.

The page other than the displayed first page may be within a certain page range of the first page.

Detecting the one or more objects may include detecting at least an image, a video or text located on the page other than the displayed first page within the certain page range.

Displaying the at least one selected object may include editing the first page to facilitate the display of the at least one selected object on the first page.

The method may further include: receiving a selection of a location for displaying the at least one selected object on the first page; and rearranging a display of text on the first page based on the selected location.

Rearranging the display of text may include moving text located at the selected location to a different location on the displayed first page.

Moving the text may include moving the text to a page consecutive to or previous to the first page.

The method may further include storing the edited first page.

Displaying the at least one selected object may include displaying the at least selected object to overlap text of the first page in a transparent manner.

The method may further include: detecting a touch input; and changing at least the transparency of the displayed at least one selected object based on the detected touch input or moving the displayed at least one selected object based on the detected touch input.

The method may further include displaying the detected one or more objects on a display unit.

The detected one or more objects may be displayed on a region of the display unit when a touch is sensed on the display unit.

The one or more detected objects may include a plurality of objects, and the plurality of objects may be displayed in a region of the display unit.

The method may further include displaying the plurality of objects in a sequence based on at least an attribute of the plurality of objects, a page on which each of the plurality of objects is detected, or an order in which the plurality of objects were detected.

The method may further include maintaining the display of the plurality of objects in the region when a different page is displayed.

The method may further include displaying at least one or more newly detected objects together with the plurality of objects in the region when the different page is displayed.

The method may further include displaying at least one of the plurality of objects on the first page in response to a dragging input.

According to one embodiment, a mobile device includes: a display unit configured to display a first page; a detector configured to detect one or more objects associated with text of the displayed first page and located on a page other than the displayed first page; and a controller configured to control the display unit to display the detected one or more objects on the first page.

The mobile device may further include a user input unit configured to receive a selection of at least one object of the one or more detected objects. The controller may be further configured to control the display unit to display the selected at least one object on the first page.

The controller may be further configured to at least: edit the first page to facilitate the display of the selected at least one object on the first page; or display the selected at least one object on the first page to overlap text of the first page.

The detector may be further configured to detect an object tagged with information associated with text of the first page.

The controller may be further configured to control the display unit to display the detected one or more objects on a region of the display unit.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain principles and features of embodiments of the invention. In the drawings:

FIG. 2 is a flow chart illustrating a method of controlling a mobile device according to an embodiment of the present invention;

FIGS. 3A, 3B and 3C are views of screen displays illustrating a method of detecting an object in a mobile device according to an embodiment of the present invention;

FIGS. 4A and 4B are views of screen displays illustrating a method of displaying a detected object on a page in a mobile device according to an embodiment of the present invention;

FIGS. 5A, 5B, 5C, 5D and 5E are views of screen displays illustrating a method of displaying a plurality of detected objects in a mobile device according to an embodiment of the present invention.

DETAILED DESCRIPTION

Embodiments of the present invention will be described in more detail herein with reference to the accompanying drawings. The same reference numbers will be used throughout the drawings to refer to the same or similar parts, and redundancies in the description of such parts will be avoided to the extent possible.

The suffix 'device', 'module' or 'unit' may be used herein to describe constituent elements in order to facilitate disclosure of various embodiment. Therefore, special meaning or function is not assigned to the suffix itself.

Known technologies will not be described in detail herein so as not to obscure disclosure regarding aspects and features of the present invention. Also, the accompanying drawings are presented merely to illustrate particular embodiments of the present invention, and it is not intended that the drawings be construed as limiting the spirit or scope of the invention.

Examples of a mobile device may include a portable phone, a smart phone, a laptop computer, a digital broadcast terminal, a personal digital assistant (PDA), a portable multimedia player (PMP), and a navigator. However, it would be appreciated by those skilled in the art that features described herein may be applicable to a stationary terminal such as a digital TV, a desktop computer, or a similar device that does not necessarily include components particularly configured for mobile use.

Figure 1:
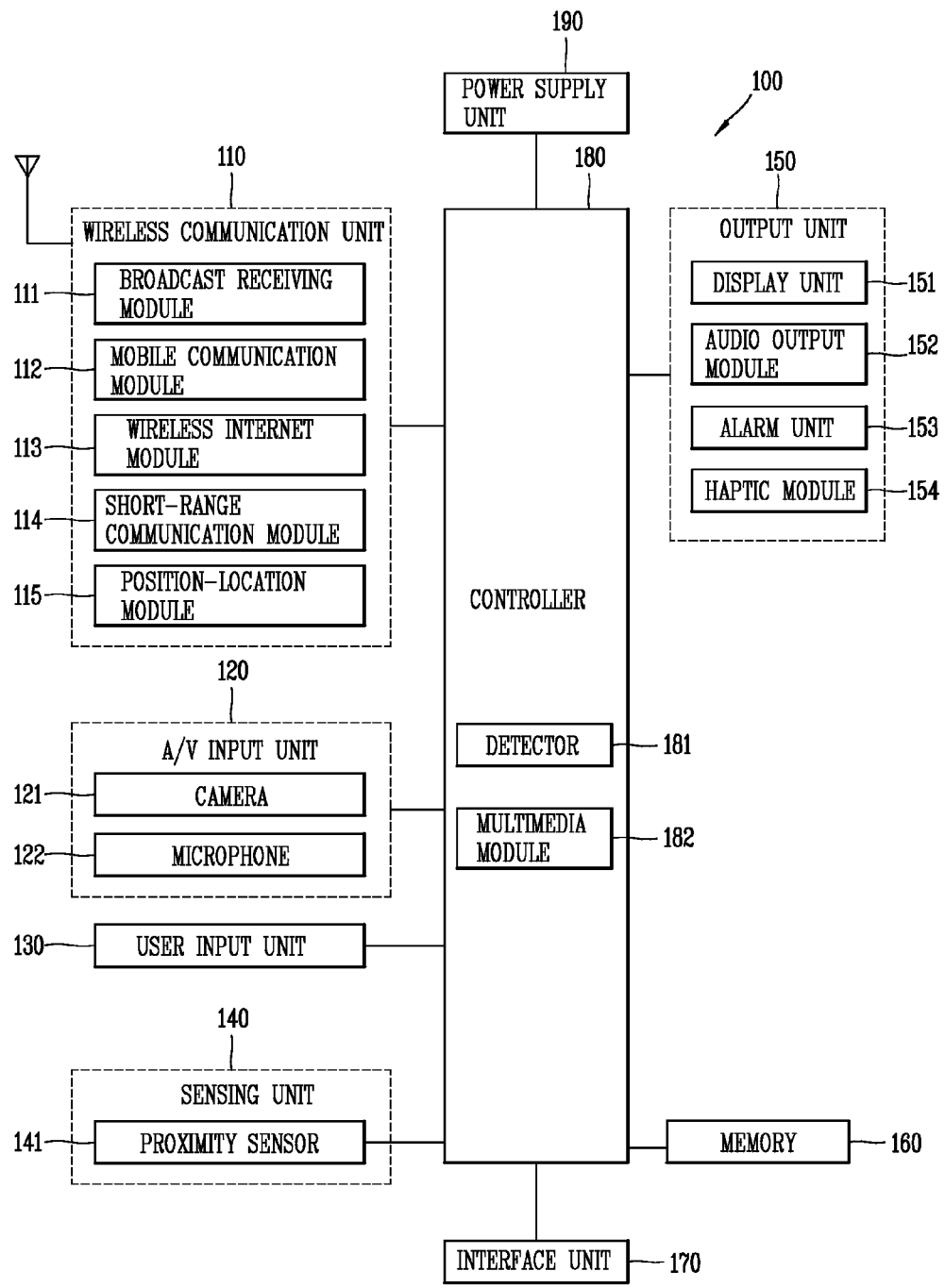
FIG. 1 is a block diagram of a mobile device according to an embodiment of the present invention.

FIG. 1 is a block diagram of a mobile device 100 according to an embodiment of the present invention. The mobile device 100 may include a wireless communication unit 110, an audio/video (A/V) input unit 120, a user input unit 130, a sensing unit 140, an output unit 150, a memory 160, an interface unit 170, a controller 180, and a power supply unit 190. Although the mobile device 100 is illustrated as having various components in FIG. 1, it is understood that a greater or a fewer number of components may be implemented.

The wireless communication unit 110 may include one or more components facilitating radio communication between the mobile device 100 and a wireless communication system or between the mobile device and a network in which the mobile device is located. For example, the wireless communication unit 110 may include a broadcast receiving module 111, a mobile communication module 112, a wireless Internet module 113, a short-range communication module 114, and a position-location module 115.

The broadcast receiving module 111 receives broadcast signals and/or broadcast associated information from an external broadcast management server through a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and then transmits the received signal and/or information to the mobile device 100.

The broadcast signal and/or broadcast-associated information received through the broadcast receiving module 111 may be stored in the memory 160. The broadcast signal may include a TV broadcast signal, a radio broadcast signal and a data broadcast signal as well as a broadcast signal in which a data broadcast signal is coupled to the TV broadcast signal or radio broadcast signal.

The broadcast associated information may include information regarding a broadcast channel, a broadcast program, or a broadcast service provider. The broadcast associated information may also be provided through a mobile communication network in which case the broadcast associated information may be received by the mobile communication module 112.

The broadcast associated information may be implemented in various forms. For example, it may be implemented to include an electronic program guide (EPG) of digital multimedia broadcasting (DMB) and an electronic service guide (ESG) of digital video broadcast-handheld (DVB-H).

The broadcast receiving module 111 may receive a broadcast signal from various types of broadcast systems such as digital multimedia broadcasting-terrestrial (DMB-T), digital multimedia broadcasting-satellite (DMB-S), media forward link only (MediaFLO™), digital video broadcast-handheld (DVB-H), and integrated services digital broadcast-terrestrial (ISDB-T). It is understood that the broadcast receiving module 111 may be configured to be suitable for other broadcast systems that provide a broadcast signal as well as the identified digital broadcast systems.

The mobile communication module 112 transmits and/or receives a radio signal to and/or from at least a base station, an external terminal or a server over a mobile communication network. The radio signal may include a voice call signal, a video call signal and/or various types of data pertaining to text and/or multimedia message transmission and/or reception.

The mobile communication module 112 may be configured to implement an video communication mode and a voice communication mode. The video communication mode refers to a configuration in which communication is made while viewing an image of a counterpart user, and the voice communication mode refers to a configuration in which communication is made without viewing an image of the counterpart user. The mobile communication module 112 may be configured to transmit or receive at least voice or image data to implement the video communication mode and voice communication mode.

The wireless Internet module 113 is for supporting wireless Internet access. The wireless Internet module 113 may be built-in or externally coupled to the mobile device 100. The wireless Internet module 113 may use a wireless Internet access technique including a wireless local area network (WLAN), Wi-Fi™, Wireless Broadband (Wibro™), World Interoperability for Microwave Access (Wimax™), and High Speed Downlink Packet Access (HSDPA).

The short-range communication module 114 is for supporting short-range communication. The short-range communication module 114 may use a short-range communication technology including Bluetooth™, Radio Frequency IDentification (RFID), Infrared Data Association (IrDA), Ultra WideBand (UWB), and ZigBee™.

The position-location module 115 is for checking or acquiring a location of the mobile device 100. An example of the position-location module 115 is a global positioning system (GPS) module.

With continued reference to FIG. 1, the NV input unit 120 receives an audio or video signal. The A/V input unit 120 may include a camera 121 and a microphone 122.

The camera 121 processes an image frame such as a still picture or a video image that is obtained by an image sensor operating in a video call mode or an image capturing mode. The processed image frame may be displayed by the display unit 151.

The image frames processed by the camera 121 may be stored in the memory 160 or transmitted to an external device through the wireless communication unit 110. The mobile device 100 may include two or more cameras 121 based on the usage environment.

The microphone 122 receives an external audio signal when the mobile device 100 is operating in a phone call mode, a recording mode, or a voice recognition mode. The microphone 122 processes and converts the audio signal into electronic audio data. The processed audio data may be converted and output into a format that can be transmitted to a mobile communication base station through the mobile communication module 112 during a phone call mode. The microphone 122 may implement various types of noise canceling algorithms to cancel noise generated when receiving the external audio signal.

The user input unit 130 may generate input data to control an operation of the mobile device 100. The user input unit 130 may include a keypad, a dome switch, a pressure-type or capacitive touch pad, a jog wheel, or a jog switch.

The sensing unit 140 detects a current status of the mobile device 100 such as an opened or closed state of the mobile device, a location of the mobile device, or an orientation of the mobile device. The sensing unit 140 generates a sensing signal for controlling the operation of the mobile device 100.

For example, when the mobile device 100 is a slide-type mobile telephone, the sensing unit 140 may sense whether a sliding portion of mobile telephone is in an open or a closed position. Furthermore, the sensing unit 140 may perform a sensing function associated with whether power is supplied from the power supply unit 190, or whether an external device is coupled to the interface unit 170.

Also, the sensing unit 140 may include a proximity sensor 141. The proximity sensor 141 may be located at an internal region of the mobile device 100 surrounded by a touch screen, or near the touch screen. The proximity sensor 141 may sense the presence of an object approaching or located near a sensing surface based on an electromagnetic field or infrared rays without mechanical contact. The proximity sensor 141 may have a longer lifespan and may be suitable for more utility applications relative to a contact type sensor.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, or an infrared proximity sensor. When the touch screen includes a capacitance type proximity sensor, it may sense the proximity of a pointer with respect to the touch screen based on changes of an electromagnetic field, and the touch screen (touch sensor) may be considered as a proximity sensor 141.

For convenience of description, an action in which a pointer approaches the touch screen without actually contacting the touch screen (but is effectively recognized as a touch of the touch screen) may be referred to as a 'proximity touch.' An action in which a pointer actually touches the touch screen may be referred to as a 'contact touch'. The position of the touch screen that is proximity-touched by the pointer may refer to a portion of the touch screen that is vertically opposite the pointer when the pointer performs the proximity touch.

The proximity sensor 141 may sense a proximity touch and a proximity touch pattern (e.g., a distance, direction, speed, time, position, or moving status). Information relating to the sensed proximity touch and the sensed proximity touch pattern(s) may be output to the touch screen.

The output unit 150 is configured to provide an output such as an audio signal, video signal, or alarm signal. The output unit 150 may include the display unit 151, an audio output module 152, an alarm unit 153, and a haptic module 154.

The display unit 151 may display (output) information processed in the mobile device 100. For example, when the mobile device 100 is operating in a phone call mode, the display unit 151 may display a User Interface (UI) or a Graphic User Interface (GUI) associated with a call. When the mobile device 100 is operating in a video call mode or image capturing mode, the display unit 151 may display a captured image and/or a received image, and a UI or a GUI.

The display unit 151 may include at least a Liquid Crystal Display (LCD), a Thin Film Transistor-LCD (TFT-LCD), an Organic Light Emitting Diode (OLED) display, a flexible display, a three-dimensional (3D) display, or an e-ink display. The display unit 151 may be configured as a transparent or optical transparent type display (i.e., a transparent display) to facilitate viewing of an exterior environment through the display unit. An example of a transparent display is a transparent LCD (TOLED). Under this configuration, a user may be able to see an object located behind the body of the mobile device 100 through the transparent portion of the display unit 151 on the body of the mobile device.

According to one embodiment, the mobile device 100 may include two or more display units 151. The display units 151 may be spaced apart from each other or may be integrated as one body. Alternatively, a plurality of display units 151 may be arranged on different surfaces of the mobile device 100.

If the display unit 151 and a touch sensitive sensor (i.e., a touch sensor) form a mutual layer structure (i.e., a touch screen), the display unit 151 may be used as an input device as well as an output device. The touch sensor may be implemented using a touch film, a touch sheet, or a touch pad.

The touch sensor may be configured to convert a variation of a pressure applied to a specific portion of the display unit 151 or a variation of a capacitance generated at a specific portion of the display unit 151 to an electric input signal(s). Also, the touch sensor may be configured to sense not only a touched position and a touched area, but also a touch pressure.

When a user applies a touch input to the touch sensor, signal(s) corresponding to the touch input may be transmitted to a touch controller (not shown). The touch controller processes the received signal(s), and then transmits corresponding data to the controller 180. Accordingly, the controller 180 may be made aware of which portion of the display unit 151 has been touched.

The audio output module 152 may operate in a call-receiving mode, a call-placing mode, a recording mode, a voice recognition mode, or a broadcast reception mode in order to output audio data which is received from the wireless communication unit 110 or stored in the memory 160. The audio output module 152 may output audio signals relating to functions performed in the mobile device 100 (e.g., a sound indicating a call reception or a message reception). The audio output module 152 may include a receiver, a speaker, or a buzzer.

The alarm unit 153 may output signals for notifying the occurrence of events associated with the mobile device 100. The events may include call reception, message reception, key signal input reception, and touch input reception.

The alarm 153 may output not only video or audio signals, but also other types of signals such as signals for notifying occurrence of events by way of vibration. Since the video or audio signals can be output through the display unit 151 or the audio output module 152, the display unit 151 and the audio output module 152 may be regarded as a part of the alarm unit 153.

The haptic module 154 may generate various tactile effects that can be sensed by a user. Vibration is a representative example of a tactile effect generated by the haptic module 154. An intensity and a pattern of the vibration generated by the haptic module 154 may be controllable. For instance, vibrations different from one another may be output in a manner of being synthesized together or may be sequentially output.

The haptic module 154 may generate various tactile effects as well as vibration. For example, the haptic module 154 may generate an effect simulating an arrangement of pins vertically moving against a contact skin surface, an injection of air through an injection hole, a suction of air through a suction hole, a touch of a skin surface, a contact with an electrode, an electrostatic force, a production of heat using a heat emitting device, and a production of cold using a heat absorbing device.

The haptic module 154 may be configured to generate tactile effects that can be sensed through the muscular sense of a finger or a hand. According to an embodiment, the mobile device 100 may include two or more haptic modules 154.

The memory 160 may store a program for processing and controlling the controller 180. Alternatively or additionally, the memory 160 may temporarily store input/output data (e.g., phonebook data, messages, audios, still images, and videos). Also, the memory 160 may store data related to various patterns of vibrations and sounds that are output when a touch input is applied to the touch screen.

The memory 160 may be implemented using any type of suitable storage medium including a flash memory, a hard disk, a multimedia card micro type memory, a memory card type memory (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, and optical disk. Also, the mobile device 100 may operate in association with a web storage which performs a storage function of the memory 160 on the Internet.

The interface unit 170 may generally be implemented to serve as an interface for the mobile device 100 with external devices. The interface unit 170 may facilitate data reception from an external device, power delivery to components of the mobile device 100, or data transmission from the mobile device to an external device. The interface unit 170 may include, for example, a wired/wireless headset port, an external charger port, a wired/wireless data port, a memory card port, a port for coupling devices having an identification module, an audio Input/Output (I/O) port, a video I/O port, or an earphone port.

The identification module may be configured as a chip for storing various information required to authenticate an authority to use the mobile device 100. The identification module may include a User Identity Module (UIM) or a Subscriber Identity Module (SIM). Also, a device having the identification module (hereinafter, referred to as 'identification device') may be implemented as a type of smart card. Hence, the identification device can be coupled to the mobile device 100 via a port.

When the mobile device 100 is connected to an external cradle, the interface unit 170 may serve as a path for supplying the mobile device 100 with power from the external cradle or as a path for transferring various command signals input by a user via the cradle to the mobile device 100. The various command signals or the power may operate as signals facilitating recognition that the mobile device has accurately been mounted to the cradle.

The controller 180 may control the overall operations of the mobile device 100. For example, the controller 180 may perform the control and processing associated with telephony calls, data communications, or video calls. Furthermore, the controller 180 may perform a pattern recognition process for recognizing handwriting input or drawing input applied to the touch screen as characters or images.

The controller 180 may include a multimedia module 182 for reproducing multimedia data. The multimedia module 182 may be implemented as an integrated component within the controller 180 or may be implemented as a component separate from the controller 180.

The power supply unit 190 receives external power and internal power under the control of the controller 180 to provide power required by various components.

Various embodiments described herein may be implemented in a medium that can be read by a computer or a similar device using software, hardware, or a combination of software and hardware. According to a hardware implementation, embodiments described herein may be implemented by using at least application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and other electrical units designed to perform the functions described herein. In some cases, such embodiments may be implemented in the controller 180 itself.

According to a software implementation, under various embodiments, procedures or function may be implemented using separate software modules. The software modules may perform at least one function or operation described herein. Software code may be implemented using a software application written in any suitable programming language. The software may be stored in the memory 160 and executed by the controller 180.

A method including detecting an object associated with a page displayed on the display unit 151 and displaying the detected object along with the page will be described with reference to various embodiments.

According to one embodiment, the controller 180 may include a detector 181 for detecting an object located on a page other than the page displayed on the display unit 151. The detector 181 may detect an object associated with text located in the page displayed on the display unit 151, the object located on a page other than the page displayed on the display unit.

If an object is detected by the detector 181, then the controller 180 may control the display unit 151 to display at least one of the detected objects on a displayed page. Furthermore, the controller 180 may control the display unit 151 to display a detected object that is selected by a user on the displayed page.

Figure 3B:
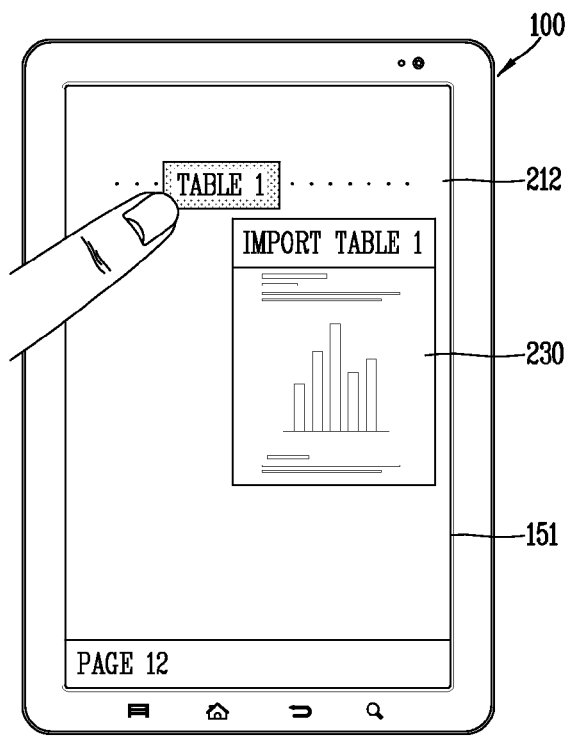
Figure 3C:
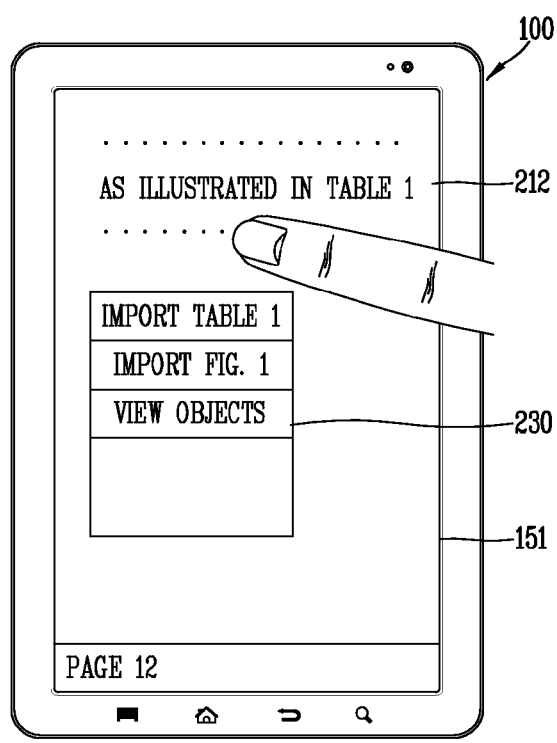

With reference to FIGS. 2, 3A and 3B and to FIG. 1 (e.g., the controller 180 and the detector 181), a method for controlling a mobile device, including detecting an object, will be described. FIG. 2 is a flow chart illustrating a method of controlling a mobile device according to an embodiment of the present invention. and FIGS. 3A through 3C are views of screen displays for illustrating detection of an object in the mobile device.

With reference to FIG. 2, a method of controlling a mobile device includes displaying a page on the display unit 151 [S100]. The page may include at least text, an image, a video or an icon. For example, the page may be a webpage or a page of an electronic book (i.e., e-book). The page may include a single page or a plurality of pages.

Referring to FIG. 3A, a first page 211 is illustrated as being numbered as "PAGE 11" on the display unit 151 and includes text 201 and a first object 220. A second page 212 is illustrated as being numbered as "PAGE 12" and includes text 202. A third page 213 is illustrated as being numbered as "PAGE 13" and includes text 203 and a second object 221.

As used herein, the term 'object' may refer to various types of objects such as an image, a video, or an icon. Furthermore, the term 'object' may also refer to text located in a portion of a page that is selected by a user.

Referring back to FIG. 2, if any one of a plurality of pages containing at least one object is displayed, then the controller 180 may detect an object that is associated with the displayed page [S200]. The detected object is contained in (or located on) a page that is different from the displayed page.

For example, referring to FIG. 3A, if the second page 212 is displayed on the display unit 151, then the controller 180 may detect an object that is associated with the second page 212 and that is located on a different page, for example, the first page 211 and/or the third page 213. The detected object may be an object associated with content of the displayed second page 212. Also, the detected object may be an object located on a page within a predetermined page range of the displayed page.

Therefore, with reference back to FIG. 2, detecting an object that is associated with the displayed page [S200] may include detecting an object that is tagged with information associated with text located on the displayed page [S215] and detecting objects (e.g., all objects) contained in other pages within a specified range of the displayed page [S220].

Detecting an object that is tagged with information associated with text located on a displayed page (e.g., second page 212) [S215] will now be described in more detail.

First, the controller 180 allows the user to specify (or select) certain text from the text that is contained in the displayed page [S210]. Specifying the text facilitates the detection of an object that is tagged with information associated with text located on the displayed page [S215].

The user may specify certain text by performing a touch input or a key input. For example, with reference to FIG. 3B, if the user specifies the text "Table 1" on the displayed page 212 via a touch input, then the text "Table 1" is selected, and the selected text may be displayed in a manner different from text that is not selected.

Furthermore, if the text "Table 1" is specified in the manner described, then the controller 180 detects an object tagged with information associated with the specified text [S215]. The detected object is located on a page different from the displayed page 212. In addition, if such objects are detected, then the controller 180 may control the display unit 151 to display lists of or icons representing the detected objects on the displayed page 212.

The detection of an object tagged with information associated with the specified text may be based on tag information corresponding to the object. Tag information of an object may refer to a collection of words (e.g., keywords) which indicate a feature, meaning and/or title of the object.

An object may have tag information that was entered by a user. Also, an object may have tag information that was not entered by a user. As such, an object may have tag information even when the user has not entered tag information for the object.

Furthermore, the tag information may be in the form of metadata. Metadata is data that describes other data (for example, an object such as Table 1 of page 211). The tag information may be used to effectively find other information.

Referring to FIG. 3B, the user specifies the text "Table 1" on the displayed page 212 [FIG. 2, S210]. The controller 180 detects an object that is tagged with information associated with the specified text "Table 1" [FIG. 2, S215]. The controller detects object 220 of page 211 (see FIG. 3A) as containing tag information regarding "Table 1". The object 220 may include tag information corresponding to Table 1.

Detecting objects contained in other pages within a specified range of the displayed page [FIG. 2, S220] will now be described in more detail with reference to FIGS. 3A and 3C.

According to one embodiment, the controller 180 detects all objects (e.g., an image, a video, an icon, or scrapped text) located in pages that are within a predetermined page range of the page that is displayed on the display unit 151. For example, if the page that is displayed on the display unit 151 is page 212 (i.e., the page that is numbered as "PAGE 12") and a page range is specified as being "the previous 10 pages and the next 10 pages", then the controller detects all objects such as images, videos, icons and texts that are contained in pages numbered from "PAGE 2" to "PAGE 11" as well as pages numbered from "PAGE 13" to "PAGE 22".

Therefore, the controller 180 may detect the object 220 (i.e., TABLE 1) located on page 211 (which is numbered as "PAGE 11") and detect the object 221 (i.e., FIG. 1) located on page 213 (which is numbered as "PAGE 13) (see FIG. 3A and FIG. 2, [S220]). With reference to FIG. 3C, the controller 180 may provide a list of the detected objects 220 and 221 when the objects are detected.

The controller 180 may control the display unit 151 to display the list in a setting window 230. The list may be displayed based on a touch input performed by the user. The setting window 230 may display icons corresponding to the detected objects or a list containing information corresponding to the detected objects.

If objects contained in pages are detected as described above (FIG. 2, [S200], [S220]), then the controller 180 enables the user to select at least one of the detected objects for display on the display unit 151 (FIG. 2, [S300]). With reference to FIG. 3B, the user may select the detected object 220 by selecting the setting window 230, which reads "IMPORT TABLE 1". With reference to FIG. 3C, the user may select the detected object 220 by selecting "IMPORT TABLE 1" from the list that is displayed in the setting window 230.

As described, the user may select one or more of the detected objects through the setting window 230 (FIG. 2, [S300]). If an object is selected by the user, then the controller 180 may control the display unit 151 to display the selected object on the displayed page (FIG. 2, [S400]). As such, information associated with a displayed page may be detected and provided to the user, so that the user may use the associated information together with contents of the displayed page.

According to a further embodiment, even if the user does not select at least one of the detected objects, the detected object(s) may be automatically displayed on the page if the tag information of the object(s) is identical to contents of text contained in the displayed page. Displaying of one or more detected objects will be described in more detail with reference to FIG. 4A.

As described earlier, if an object associated with a displayed page (e.g., page 212) is detected by the detector 181 and one of the detected objects is selected by the user, then the selected object is displayed on the displayed page. The selected object may be displayed in a transparent manner such that the display of the selected object overlaps other contents of the displayed page such as text, an image, or a video that is contained in the displayed page.

The degree or level at which the selected object is transparent may be set by the user. Accordingly, the controller 180 displays the selected object at the set level such that the user is able to view other contents of the displayed page (i.e., contents that are overlapped by the display of the selected object).

Figure 4A:
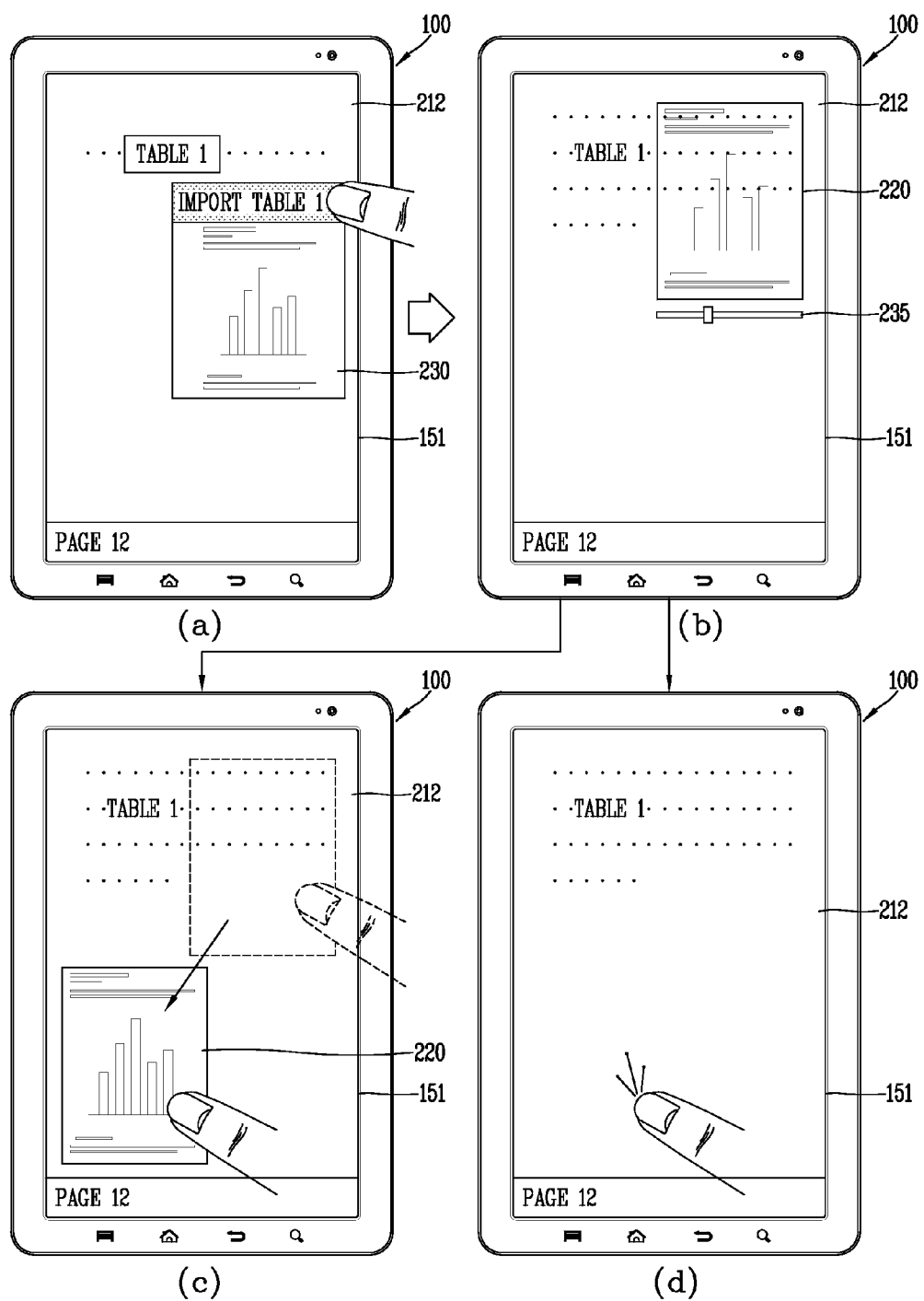

For example, with reference to FIGS. 4A(a) and (b), object 220 is selected and displayed to overlap other contents of the displayed page 212. The degree at which the selected object 220 is transparent may be set by the user using scroll bar 235. As such, it may be possible for the user to view the object 220 and the overlapped contents at the same time.

Furthermore, with reference to FIG. 4A(c), the display of the object 220 may be moved within the page 212 based on a touch input sensed by the display unit 151. The touch input for moving the object 220 may be a touch input sensed at a region of the display unit 151 where the object 220 is displayed. As illustrated with reference to FIG. 4A(c), the display of the object 220 may be moved from the upper right corner of the page 212 to the lower left corner of the page.

Furthermore, display of the object 220 on the displayed page 212 may be ceased based on a touch input sensed by the display unit 151. For example, the touch input may be a touch input sensed at a region of the display unit 151 outside or apart from where the object 220 is displayed. As illustrated with reference to FIGS. 4A(b) and (c), the display of the object 220 (at the upper right corner of the page 212) may be ceased based on a touch input sensed at a bottom region of the display unit 151 outside or apart from the upper right corner of the page.

Furthermore, display of the object 220 may cease when the displayed page is changed, such as when the displayed page is changed from page 212 to another page. For example, when a currently displayed page is page 212 (i.e., the page that is numbered as "PAGE 12") and the user changes the displayed page to page 213 (i.e., the page that is numbered as "PAGE 13"), the object 220 that had been displayed on the page 212 is not displayed on the new page 213.

With reference back to FIG. 2, if the object 220 selected by the user is displayed on the page 212 [S400], then the page 212 is set to be edited or not to be edited for display of the object [S500]. The user may specify whether the page 212 is to be edited. If the object 220 is selected to be displayed on the page 212, then the page can be edited while the object is displayed on the page.

If the page 212 is set not to be edited for display of the object 220, then the display of object 220 is maintained on the page to overlap other contents of the displayed page 212. Display of the object 220 is ceased when the displayed page is changed.

If the page 212 is set to be edited for display of the object 220 (for example, it is set via a "FIXED HERE" menu of a setting window 230 (see FIG. 4B(b))), then the controller 180 edits the configuration of the page to better display the object on the page 212. Editing the page will be described in more detail with reference to FIG. 4B.

As illustrated in FIGS. 4B(a) and (b), an object 220 detected by the detector 181 is selected by the user. The controller 180 controls the display unit 151 to display the object 220 on the page 212.

If the object 220 is displayed on the page 212 at a particular location, then the user may specify another location at which the object 220 is to be displayed (FIG. 2, [S510]). The other location at which the object 220 is to be displayed may be specified by the user via a drag input. Also, the other location may be a region that contains text associated with the object 220 and that is recommended by the controller 180. The user may specify that the object 220 is to be displayed at the region recommended by the controller.

If the other location at which the object 220 is to be displayed is determined, then the page 212 is edited based on this other location upon receiving an input from the user for fixing the position of the object on the page. Furthermore, the controller 180 fixes the position of the object 220 on the page 212 in real time according to the determined location and edits the page 212 according to the fixed position.

As used herein, the term "editing" may refer to moving a text that had been positioned at the location at which the object 220 is to be displayed to a different location such that the display of the object will not overlap the text, thereby facilitating display of the object 220 on the page 212 (FIG. 2, [S520]). For example, as illustrated in FIG. 4B(a) to (d), if the position of the object 220 is selected to be fixed on the page 212, the controller 180 fixes the position of the object 220 according to the determined location, and moves text that would have been overlapped by the object to an adjacent side (e.g., a left side) or to another row. Furthermore, the controller 180 may also rearrange text located on pages that are adjacent to the displayed page 212 based on the rearrangement of text on the page 212.

For example, if text contained on the page 212 is rearranged due to the display of the objet 220 such that the text does not appear on the page 212, the text may be moved to a consecutive page 213. Furthermore, text that already located on the consecutive page 213 may be rearranged due to the rearrangement of the text contained in the page 212. In this manner, the controller 180 may edit the page 212 and the consecutive page 213 concurrently.

Furthermore, when the editing of the page has been completed, the controller 180 may store the edited page(s) in the memory 160 based on the display of the object 220 (FIG. 2, [S610]). The storage of the edited page may be performed upon a selection by the user or may be automatically performed based on a control setting (FIG. 2, [S600]).

A method of detecting objects associated with a page and displaying the detected object(s) on the page has been described. Hereinafter, a method of displaying the detected objects on a page prior to a selection by the user of one or more of the detected objects will be described in more detail.

FIGS. 5A through 5D are views of screen displays illustrating a method of displaying a plurality of detected objects in a mobile device 100 according to an embodiment of the present invention.

If objects associated with a page 212 are detected by the detector 181, then the controller 180 may control the display unit 151 to display the detected objects on a region of the display unit 151 to provide the user with intuitive information regarding the detected objects. The controller 180 may control the display unit 151 to display images such as icons or thumbnail images corresponding to the detected objects on the region of the display unit.

For example, as illustrated in FIGS. 5A(a) and (b), the controller 180 controls the display unit 151 to display detected objects 220, 221, 223, 224 and 225 on a region of the display unit 151. Furthermore, if an input for selecting any one of the objects 220, 221, 223, 224, 225 is sensed or a cursor or finger is positioned over one of the objects, then information regarding the selected one of the objects is displayed. The information may be information describing the object, such as a location at which the object 220 was detected (for example, "WRITTEN ON PAGE 11"), an attribute of the object, a detected date, or tag information.

Furthermore, objects displayed on the region may continue to be displayed even when the displayed page is changed from a particular page to another page. The particular objects that are displayed may depend on the other page to which the displayed page is changed.

For example, with reference to FIGS. 5A(a) and (b), the displayed page is changed from the page 212 to another page 213. According to the change to the page 213, another object (object 227) is detected. The newly detected object 227 may be displayed together with one or more of the previously detected objects 220, 221, 223, 224, 225. In addition, the newly detected object 227 may be displayed at an upper end of the region such it is displayed on top of the previously detected objects.

With continued reference to FIGS. 5A(b) and (c), the newly detected object 227 may be displayed at an upper end of the region such it is displayed on top of previously detected objects, 221, 223, 224, 225 when the displayed page is changed from the page 212 to other page 213. As such, the previously detected object 220 is no longer displayed in the region. In addition, when the displayed page is changed incrementally from the other page 213 to the original page 212 or vice versa (e.g., using a scroll bar), detected objects that correspond to the new page (but not the old page) such as object 220 may reappear in the region. Similarly, detected objects that correspond to the old page (but not the new page) such as object 227 may go out of view.

Figure 5B:
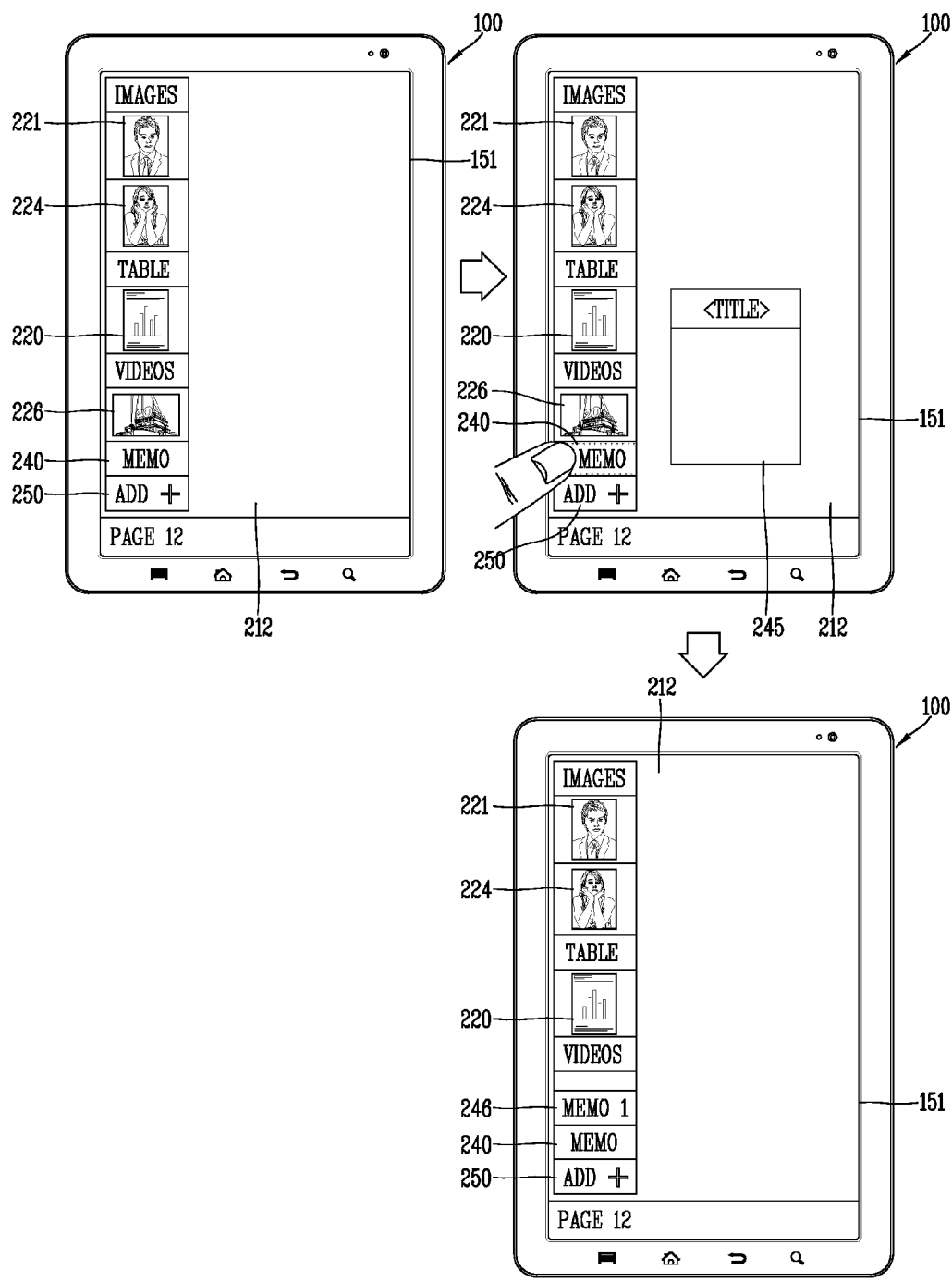

Furthermore, the controller 180, as illustrated in FIG. 5B, may control the display unit 151 to display the detected objects on the region based on a predetermined order. For example, the objects may be divided and arranged into categories (e.g., images, tables, videos) and displayed accordingly. Also, the objects may be displayed according to the order in which the objects were detected or according to the pages containing the detected objects.

Furthermore, the controller 180 may control the display unit 151 to display content entered by the user in addition to the detected objects on a page, or generate or add an object by providing a separate icon to display, for example, an object stored in the memory 160 or some other object on the page. For example, with continued reference to FIG. 5B, if a memo icon 240 is selected by a user, then a memo window 245 is displayed on the display unit 151.

Content entered by the user is displayed in the memo window 245. When the user completes entering the content, the user may select the add icon 250. The controller 180 controls the display unit 151 to display the written memo 246 or an icon representing the written memo together with the detected objects in a region of the display unit 151.

Figure 5C:
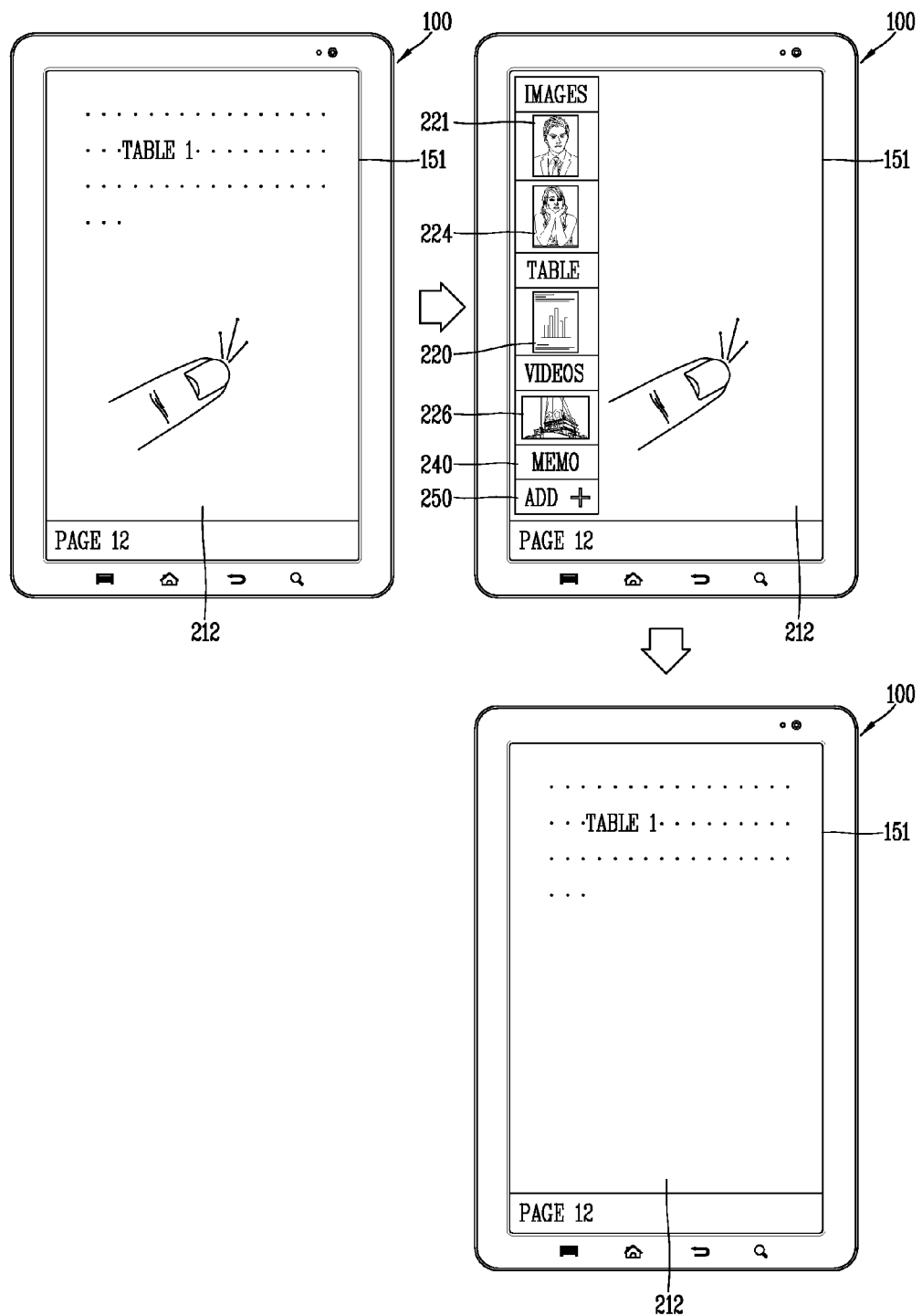

As illustrated in FIG. 5C, whether the detected objects are displayed on the display unit 151 may be based on the selection of the user. For example, if a touch input is sensed by the display unit 151 on the displayed page 212, then the detected objects are displayed on a region of the display unit. If another touch input is sensed by the display unit 151 on the page 212 while the detected objects are displayed, then the display unit 151 ceases the display of the detected objects.

Figure 5D:
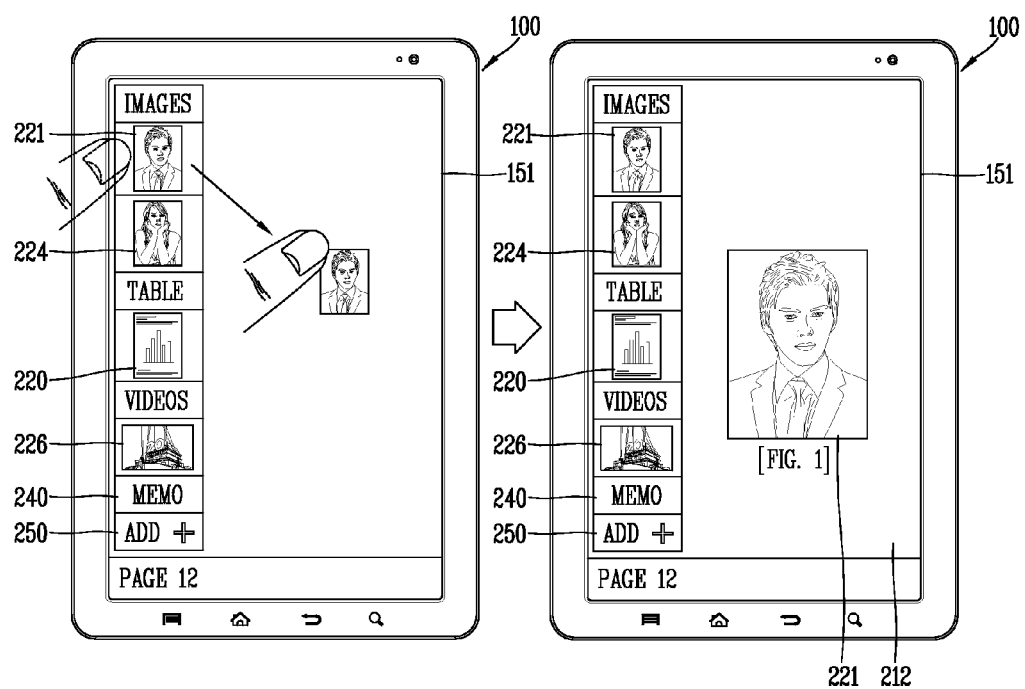

Furthermore, as illustrated in FIG. 5D, if any one of the detected objects that are displayed on the region is selected by the user via a dragging touch input on the page 212, then the selected object is displayed at the dragged location. With reference to FIG. 5D, the object 221 is selected by the user via a dragging touch input. The object 221 is then displayed on the page 212 at the dragged location.

Figure 5E:
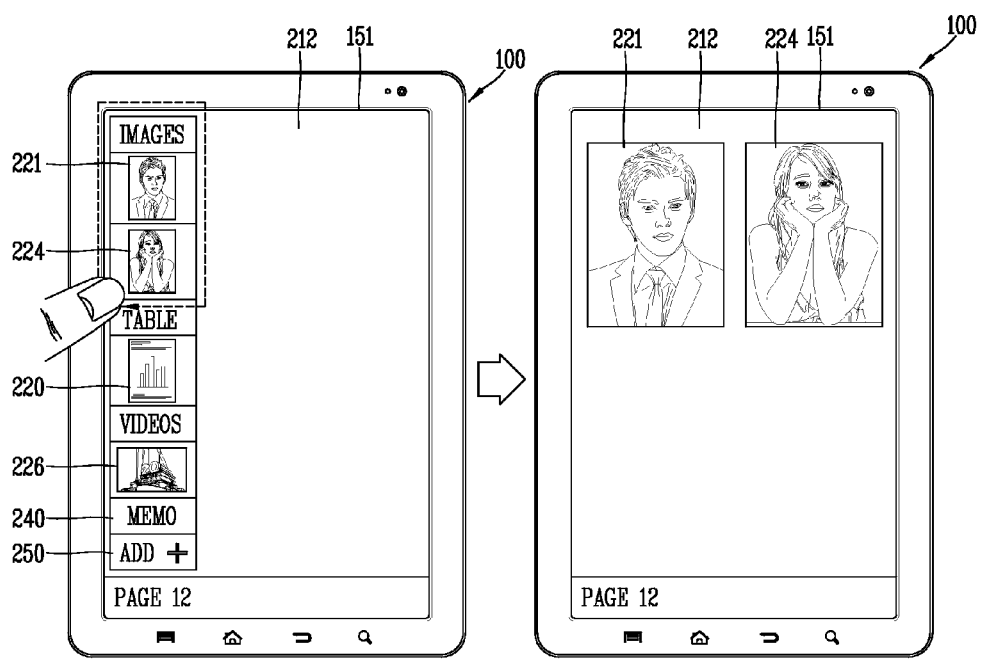

Furthermore, as illustrated in FIG. 5E, one or more of the detected objects 220, 221, 224, 226 displayed on the region may be selected. If a plurality of objects are selected by the user via a dragging touch input on the page 212, then the selected objects are displayed on the page. With reference to FIG. 5E, the objects 221 and 224 are selected by the user via a dragging touch input. The objects 221 and 224 are then displayed on the page 212.

As described previously, if the detected objects are displayed on a region of the page, then the user may obtain intuitive information regarding the detected objects that are displayed.

A method of detecting an object on pages displayed on different windows will be described in more detail with reference to FIG. 6. The controller 180 in a mobile device 100 according to an embodiment of the present invention may detect an object containing information associated with pages displayed in different windows, for example, pages displayed in a plurality of different web browser windows.

Figure 6:
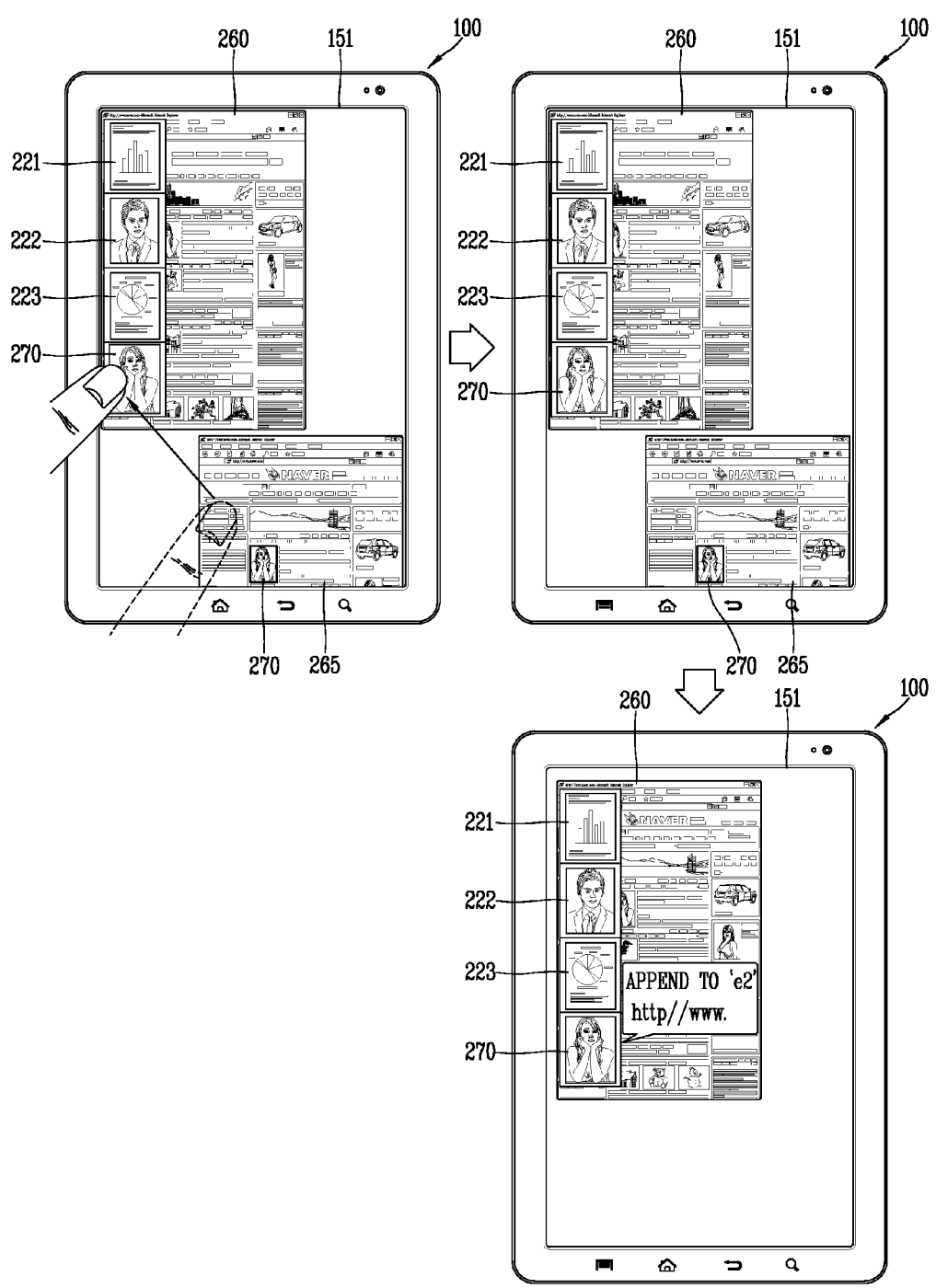
FIG. 6 is a view of screen displays illustrating a method of detecting an object of other webpages in a mobile device according to an embodiment of the present invention.

With reference to FIG. 6, a plurality of web pages 260, 265 are displayed on the display unit 151 or are in an active state in different web browser windows. The controller 180 may detect an object tagged with information associated with text of a region specified by the user.

Furthermore, the controller 180 may detect objects contained in a web page within a specified range, or display an object 270 in a web page 260 along with detected objects 221, 222, 223. The object 270 may have been contained in the web page 265 and may have dragged by the user for display in the web page 260 but was not contained in the web page 260 previously. A web page within a specified range may refer to activated web pages, or web pages having a predetermined region among the activated web pages.

Furthermore, the detector 181 may also detect URL information indicating the location information of an object detected on different web pages. Therefore, the controller 180 may import the object 270 via the URL information when the object 270 is selected.

As described previously, in a mobile device 100 in accordance with an embodiment of the present invention, an object that has information associated with a displayed page and that is located on a page different from, or non-consecutive with respect to, the displayed page is detected, thereby providing additional information to the user. As described previously, according to a mobile device 100 and a method of controlling the mobile device in accordance with an embodiment of the present invention, information associated with a displayed page may be detected and provided, thereby providing the user with associative information that may be concurrently used.

Furthermore, according to a mobile device 100 and a method of controlling the mobile device in accordance with an embodiment of the present invention, detected objects may be displayed on a page, thereby providing intuitive information regarding the detected objects to the user. In addition, according to a mobile device 100 and a method of controlling the mobile device in accordance with an embodiment of the present invention, an object having associative information that is located on a non-consecutive, or different, page may be detected and displayed, thereby providing additional information to the user.

It is understood that the configurations and methods described with reference to the foregoing embodiments do not limit the scope of the invention and that all or part(s) of each embodiment may be selectively combined and configured to produce various modifications.

What is claimed is:

1. A method of controlling a mobile device, the method comprising:
   displaying a first page of a plurality of pages of an electronic book;
   detecting one or more objects associated with the first page from the plurality of pages other than the first page;
   displaying a list comprising a plurality of items each corresponding to an object of the detected one or more objects; and
   displaying a selected object corresponding to a selected item of the plurality of items when the selected item is selected from the displayed list.

2. The method of claim 1, wherein the detected one or more objects comprise at least an image, a video or text, and each object of the detected one or more objects is tagged with information associated with the first page.

3. The method of claim 2, wherein detecting the one or more objects comprises:
   receiving a selection of text on the first page; and
   detecting an object that is tagged with information associated with the selected text and located on the plurality of pages other than the first page.

4. The method of claim 1, wherein the plurality of pages other than the first page is within a threshold page range of the first page.

5. The method of claim 1, wherein displaying the selected object comprises editing the first page to facilitate the display of the selected object on the first page.

6. The method of claim 5, further comprising:
   receiving a selection of a location for displaying the selected object on the first page; and
   rearranging a display of text on the first page based on the selected location.

7. The method of claim 6, wherein rearranging the display of text comprises moving text located at the selected location to a different location on the first page.

8. The method of claim 6, wherein moving the text comprises moving the text to a page consecutive to or previous to the first page.

9. The method of claim 5, further comprising storing the edited first page.

10. The method of claim 1, wherein displaying the selected object comprises displaying the selected object to overlap text of the first page in a transparent manner.

11. The method of claim 10, further comprising:
    detecting a touch input; and
    changing at least the transparency of the displayed selected object based on the detected touch input or moving the displayed selected object based on the detected touch input.

12. A mobile device comprising:
    a display unit configured to display a first page of a plurality of pages of an electronic book;
    a detector configured to detect one or more objects associated with the first page from the plurality of pages other than the first page in the electronic book; and
    a controller configured to cause the display unit to display:
       a list comprising a plurality of items each corresponding to an object of the detected one or more objects; and
       a selected object corresponding to a selected item of the plurality of items when the selected item is selected from the list.

13. The mobile device of claim 12, wherein the controller is further configured to at least:
    edit the first page to facilitate the display of the selected object on the first page; or
    display the selected object on the first page to overlap text of the first page.

14. The mobile device of claim 12, wherein the detector is further configured to detect an object tagged with information associated with text of the first page.

* * * * *